US008665577B2

(12) United States Patent
Levan et al.

(10) Patent No.: US 8,665,577 B2
(45) Date of Patent: Mar. 4, 2014

(54) SAFE AREA VOLTAGE REGULATOR

(75) Inventors: David O. Levan, Baldwinsville, NY (US); Munroe C. Clayton, Liverpool, NY (US)

(73) Assignee: Lockheed Martin Corporation, Bethesda, MA (US)

( * ) Notice: Subject to any disclaimer, the term of this patent is extended or adjusted under 35 U.S.C. 154(b) by 559 days.

(21) Appl. No.: 12/979,708

(22) Filed: Dec. 28, 2010

(65) Prior Publication Data

US 2012/0161726 A1 Jun. 28, 2012

(51) Int. Cl.
*H01C 7/12* (2006.01)
*H02H 1/00* (2006.01)
*H02H 1/04* (2006.01)
*H02H 3/22* (2006.01)
*H02H 9/06* (2006.01)

(52) U.S. Cl.
USPC .......................................... 361/118; 361/111

(58) Field of Classification Search
USPC ................................................ 361/111, 118
See application file for complete search history.

(56) References Cited

U.S. PATENT DOCUMENTS 4,701,690 A 10/1987 Fernandez et al.
5,563,456 A 10/1996 Berger
5,589,762 A 12/1996 Iannuzo
5,841,648 A 11/1998 Mansfield
6,713,991 B1 * 3/2004 McCallum .................... 323/226
6,717,389 B1 4/2004 Johnson
7,233,132 B1 6/2007 Dong et al.
7,304,872 B1 * 12/2007 Yakymyshyn et al. ........ 363/126
2007/0222605 A1 9/2007 Andresky
2011/0069419 A1 * 3/2011 Su et al. .......................... 361/56

OTHER PUBLICATIONS

"Intrinsically Safe Barrier Relays: NY2 and 8501TO," Square D Company, (1998), found online at http://stevenengineering.com/Tech_Support/PDFs/45RINTC.pdf (8 pages).
U.S. Appl. No. 12/979,701, filed Dec. 28, 2010 (20 pages).
International Search Report for international application No. PCT/US2011/067192, dated May 3, 2012 (6 pages).
Written Opinion of the International Searching Authority for international application No. PCT/US2011/067192, dated May 3, 2012 (5 pages).

(Continued)

*Primary Examiner* — Dharti Patel
(74) *Attorney, Agent, or Firm* — Hamre, Schumann, Mueller & Larson, P.C.

(57) ABSTRACT

A safe area voltage regulator is provided that includes a loss element, a distributed shunt regulator and an output terminal. The loss element component is directly connected to the distributed shunt regulator and includes a plurality of loss elements connected in series. The distributed shunt regulator is made up of a plurality of shunt regulators connected in parallel and is configured to regulate a peak voltage of a voltage signal to below a maximum voltage threshold. The output terminal is directly connected to the distributed shunt regulator and configured to output the voltage signal with the regulated peak voltage. The safe area voltage regulator is configured to ensure that the voltage signal with the regulated peak voltage does not exceed a maximum voltage threshold when a fault occurs to a signal power amplifier inputting the voltage signal to the safe area voltage regulator or when a fault occurs to one of the plurality of shunt regulators or when a fault occurs to one of the plurality of loss elements.

13 Claims, 6 Drawing Sheets

(56) References Cited

OTHER PUBLICATIONS

"Intrinsic Safety" definition from Wikipedia.org, found online at http://en/wikipedia.org/wiki/Intrinsic_safety, printed from the Internet on Mar. 16, 2011 (2 pages).

"Safety Barriers," R. Stahl, found online at www.r-stahl.com/products-and-systerns-safety-barriers.html, printed from the Internet on Mar. 16, 2011 (1 page).

"Intrinsic Safety Zener Barriers," MTL Instruments, found online at http://www.mtl-inst.com/products/C137, printed from the Internet on Mar. 16, 2011 (1 page).

* cited by examiner

SAFE AREA VOLTAGE REGULATOR

FIELD

This disclosure relates to the field of safe area electronic systems. More particularly, this description relates to a safe area voltage regulator.

BACKGROUND

In unsafe environments and particularly explosive environments, such as a mine environment or an oil well environment, it is necessary that the amount of energy dissipated into the surrounding atmosphere from electronic components disposed in the unsafe environment needs to remain below certain levels (e.g. 300 micro Joules) to avoid igniting a mixture of methane and air that would result in an explosion. In order to ensure that any electronic components disposed in the unsafe environment are not a risk for causing an explosion, safe area electronic systems used to drive the electronic component are required to output a signal that is guaranteed to stay below certain voltage and current levels.

SUMMARY

This application is directed to safe area electronic systems that provide a controlled voltage and current to electronic components disposed in an unsafe environment. Particularly, the embodiments described herein are discussed with respect to safe area electronic systems for use in an explosive environment, such as a mine environment or an oil well environment, where the amount of energy dissipated into the surrounding atmosphere from electronic components needs to remain below certain levels to avoid igniting a mixture of methane and air that would result in an explosion. However, the embodiments provided herein can also be used in other scenarios where controlling the amount of voltage and current provided to an electronic component is desired.

The embodiments provided herein provide a safe area voltage regulator that is capable of operating and failing in a safe manner. In particular, embodiments of the safe area voltage regulator provided herein are capable of regulating a peak voltage of a voltage signal inputted by a signal power source to a safe area voltage threshold. Also, the safe area voltage regulator is capable of maintaining the regulated peak voltage of the voltage signal near the safe area voltage threshold without exceeding the safe area voltage threshold even if one or more faults occur in the signal power source or within the voltage regulator component. Also, the embodiments provided herein provide a safe area voltage regulator that is capable of safely dissipating large wattages of power inputted into the safe area voltage regulator, until a fuse in the safe area voltage regulator blows which prevents any signal inputted into the safe area voltage regulator from being outputted from the safe area voltage regulator.

In some embodiments, a voltage regulator component is provided to meet current Mine Safety and Health Administration (MSHA) safety requirements. For example, the safe area voltage regulator is capable of regulating the full output of a 250 $\mathrm{Watt}_{rms}$ audio amplifier and capable of keeping the voltage signal output of the safe area voltage regulator at approximately a safe area voltage threshold. Particularly, a voltage regulator component is provided that regulates the peak voltage of the voltage signal from a maximum 28 $V_{rms}$ signal to an approximately 12 $V_{rms}$ signal and ensures that the peak voltage of the voltage signal outputted from the voltage regulator component will not exceed 12 $V_{rms}$ even if one or more faults occur in the signal power source or within the voltage regulator component. Also, even if a 250 $V_{rms}$ signal is inputted into the safe area voltage regulator (e.g. occurring when a primary power signal (e.g. 60 Hz in the United States of America) is inputted into the voltage regulator), the signal outputted from the safe area voltage regulator will not exceed 12 $V_{rms}$ prior to voltage regulator component failing (i.e. prior to the voltage regulator component preventing a voltage signal from being outputted from the safe area voltage regulator component).

In one embodiment, a safe area voltage regulator is provided that includes a loss element, a distributed shunt regulator and an output terminal. The loss element component is directly connected to the distributed shunt regulator and includes a plurality of loss elements connected in series. The distributed shunt regulator is made up of a plurality of shunt regulators connected in parallel and is configured to regulate a peak voltage of a voltage signal to below a maximum voltage threshold. The output terminal is directly connected to the distributed shunt regulator and configured to output a voltage signal with a regulated peak voltage. The safe area voltage regulator is configured to ensure that the peak voltage of the voltage signal does not exceed a maximum voltage threshold when a fault occurs to a signal power amplifier inputting a voltage signal to the safe area voltage regulator even when a fault occurs to one of the plurality of shunt regulators or when a fault occurs to one of the plurality of loss elements.

In one embodiment, a safe area electronic system is provided that includes a signal power source, a safe area voltage regulator and a safe area voltage and current interface. The signal power source generates a voltage signal. The safe area voltage regulator receives the voltage signal and outputs the voltage signal with a regulated peak voltage that does not exceed a safe area voltage threshold. The safe area voltage and current interface receives the voltage signal with the regulated peak voltage and outputs an intrinsically safe signal that is configured to drive an external electronic component. The safe area voltage regulator includes a loss element, a distributed shunt regulator and an output terminal. The loss element component includes a plurality of loss elements connected in series.

The distributed shunt regulator is directly connected to the loss element component and includes a plurality of shunt regulators connected in parallel. The output terminal is directly connected to the distributed shunt regulator and is configured to output the voltage signal with a regulated peak voltage. The safe area voltage regulator is configured to ensure that the voltage signal with the regulated peak voltage does not exceed a maximum voltage threshold when a fault occurs to one of the plurality of shunt regulators.

DRAWINGS

Figure 3:
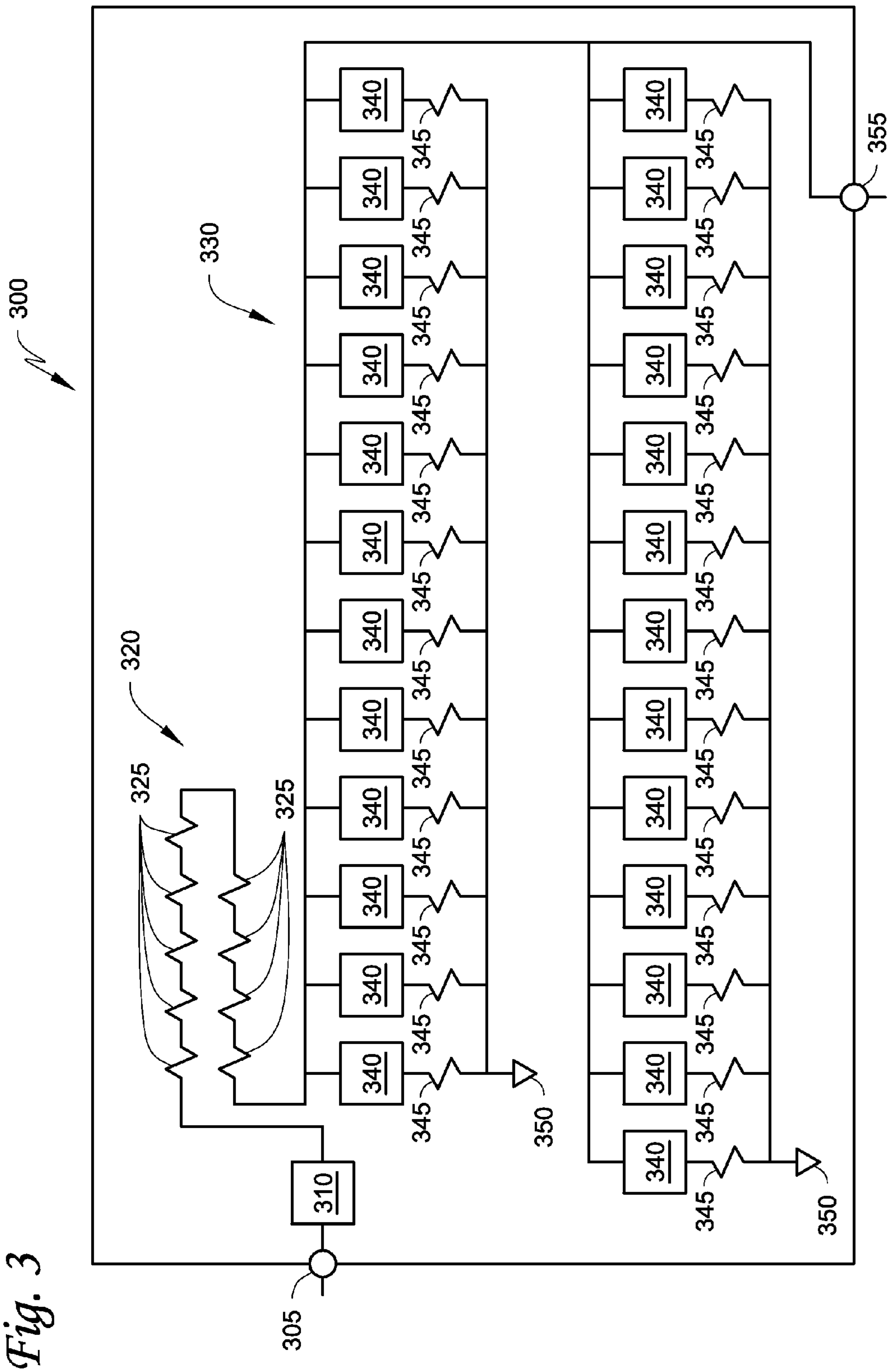

FIG. 3 provides a circuit schematic of a safe area voltage regulator component that is designed to meet current MSHA safety requirements, according to one embodiment.

Figure 4:
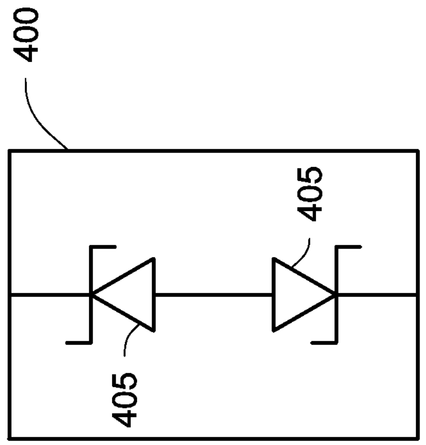

FIG. 4 provides an example of a bipolar shunt regulator for use in a safe area voltage regulator component.

Figure 5:
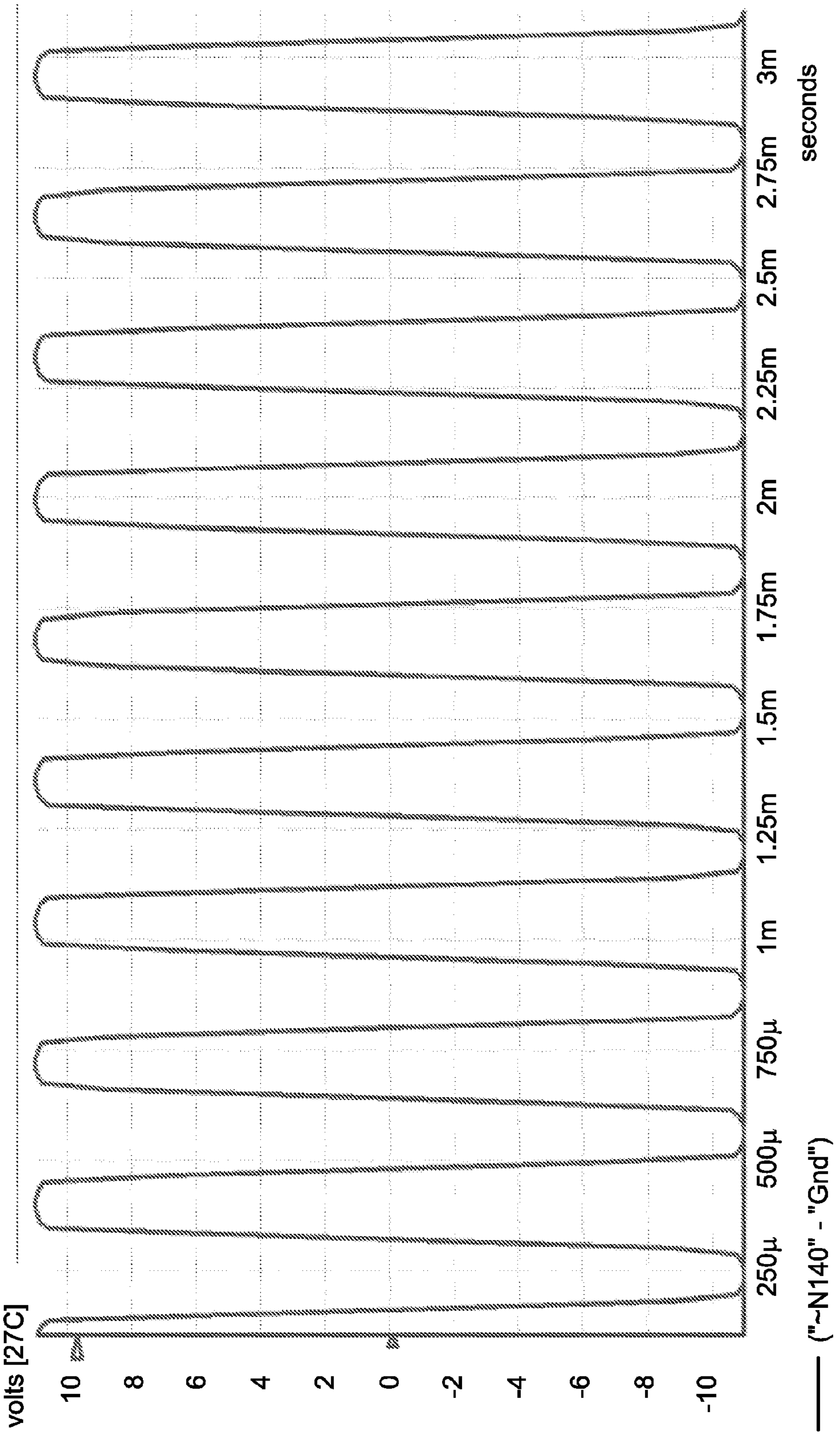

FIG. 5 is a waveform transient of a voltage signal outputted from the safe area voltage regulator component when a 23 V peak AC signal is inputted into the safe area voltage regulator component.

Figure 6:
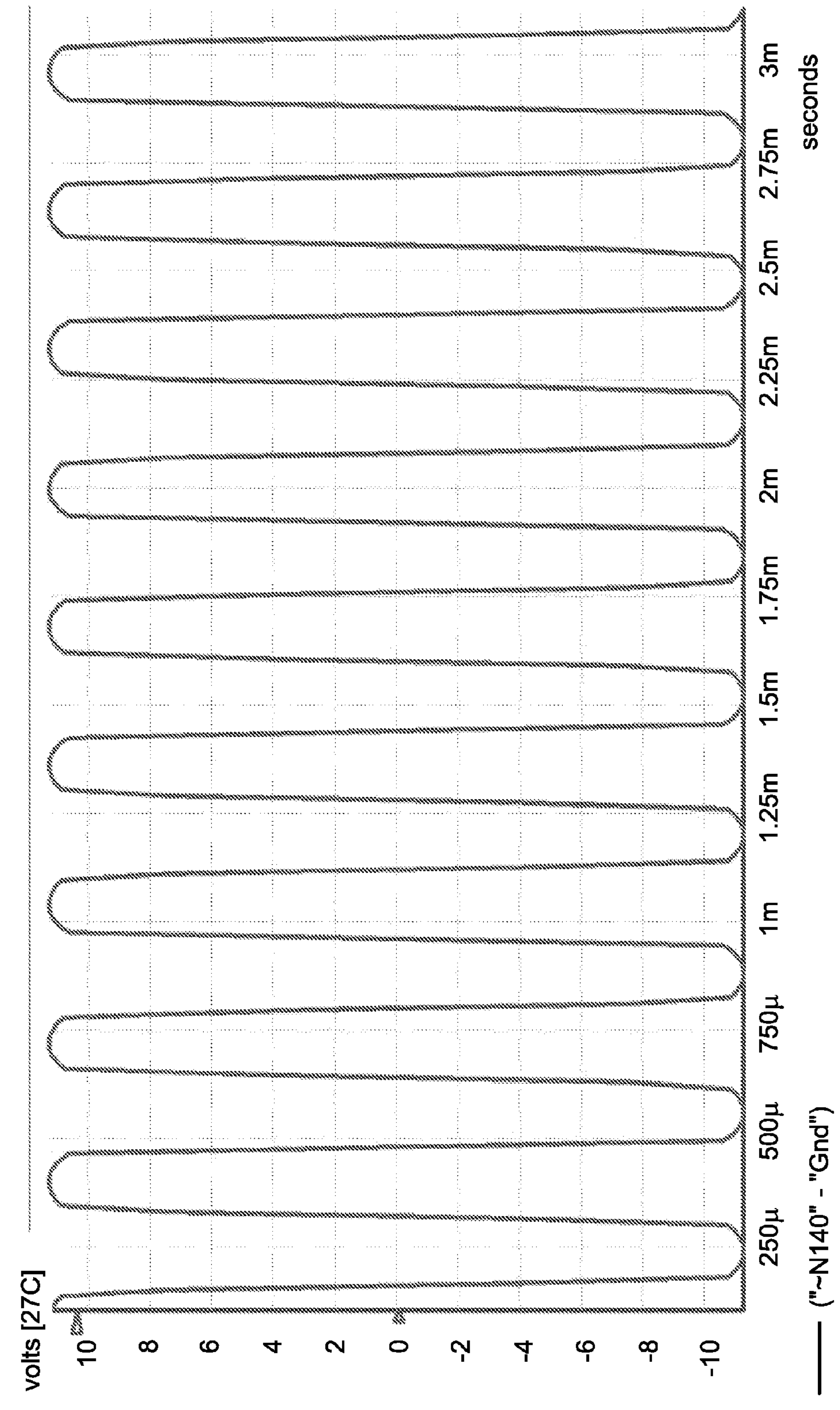

FIG. 6 is a waveform transient of a voltage signal outputted from the safe area voltage regulator component when a 35 V peak AC signal is inputted into the safe area voltage regulator component.

Figure 7:
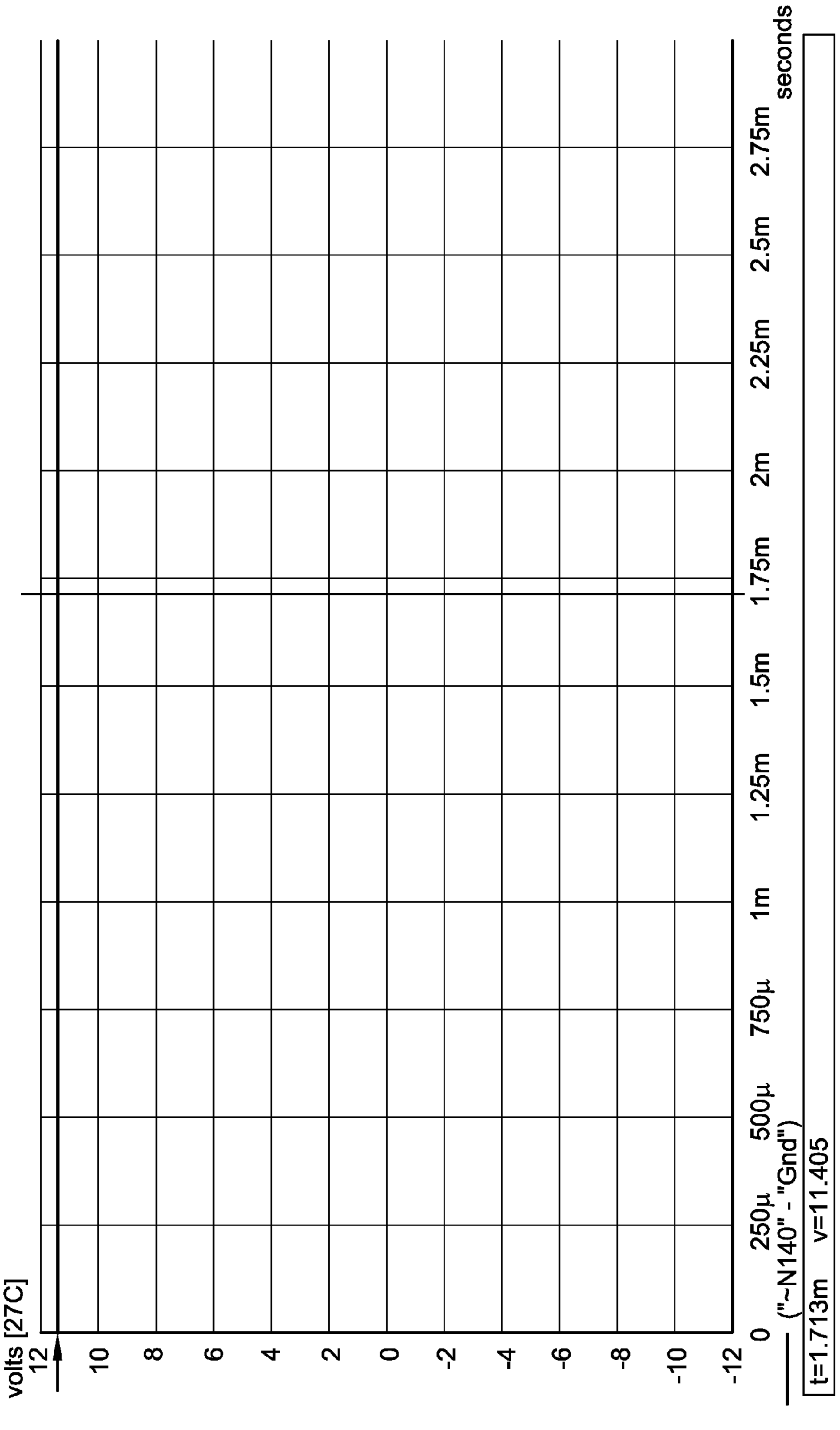

FIG. 7 is a waveform transient of a voltage signal outputted from the safe area voltage regulator component when a 45 V peak DC signal is inputted into the safe area voltage regulator component.

DETAILED DESCRIPTION

The embodiments provided herein are directed to safe area electronic systems. Particularly, the embodiments herein provide safe area electronic systems that ensure a controlled voltage and current to electronic components disposed in an unsafe environment.

In particular, the embodiments described herein are discussed with respect to safe area electronic systems for use in an explosive environment, such as a mine environment or an oil well environment, where the amount of energy dissipated into the surrounding atmosphere from electronic components needs to remain below certain levels (e.g. 300 micro Joules) to avoid igniting a mixture of methane and air that would result in an explosion. However, the embodiments provided herein can also be used in other scenarios where controlling the amount of voltage and current provided to an electronic component is desired.

The embodiments provided herein provide a safe area voltage regulator that is capable of regulating a peak voltage of a voltage signal inputted by a signal power source to a safe area voltage threshold. Also, the safe area voltage regulator is capable of maintaining the regulated peak voltage of the voltage signal near the safe area voltage threshold without exceeding the safe area voltage threshold even if one or more faults occur in the signal power source or within the voltage regulator component.

A fault as described herein is defined as any failure to a circuit element within a safe area electronic system or to an external electronic component that is driven by the safe area electronic system. Examples of faults include, but are not limited to, a loss element or bipolar shunt regulator becoming shorted or opened, a connection between the safe area electronic system and the external electronic component breaking or becoming shorted, the external electronic component breaking, etc.

Figure 1:
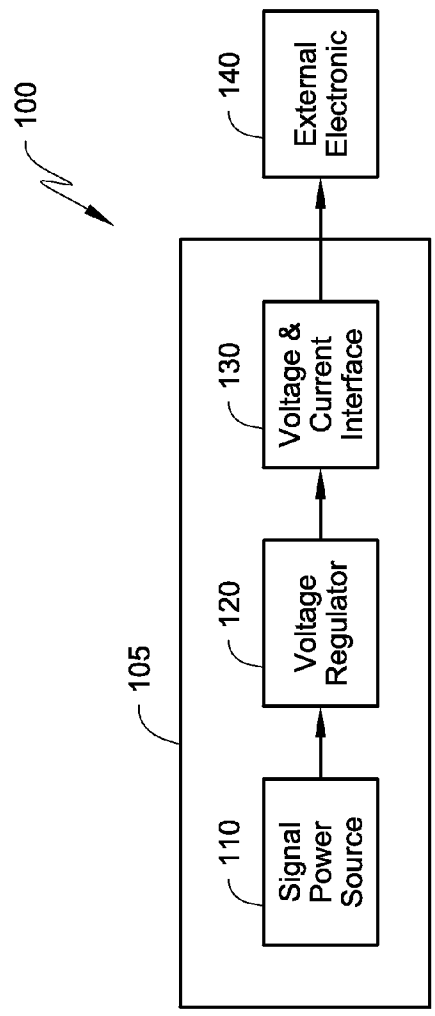
FIG. 1 is a block diagram of a safe area electronic system for providing a controlled voltage and current to an external electronic component disposed in an unsafe environment, according to one embodiment.

FIG. 1 is a block diagram of one embodiment of a safe area electronic system 100 for providing a controlled voltage and current to an external electronic component 140 disposed in an unsafe environment. Components of the system 100 are housed within an explosion proof box 105. In particular, the explosion proof box 105 houses a signal power source component 110, a safe area voltage regulator component 120 and a safe area voltage and current interface component 130.

While not shown, other electronic components and battery components can be housed within the explosion proof box 105 including, for example, a computer, an Analog to Digital Converter, a Digital to Analog Converter, an antenna preamplifier, battery chargers, low level amplifiers, batteries (such as 12 volt lead acid batteries or NiMH batteries), etc. In one embodiment, the design constraints of the explosion proof box 105 are determined based on the safety criteria provided by health and safety organizations such as, for example, MSHA.

The signal power source 110 provides a voltage signal used to drive the safe area voltage and current interface component 130. The voltage signal is regulated by the safe area voltage regulator component 120 to not exceed a certain value (e.g., a safe area voltage limit) to ensure that the safe area voltage and current interface component 130 is providing an intrinsically safe voltage and current signal to the external electronic component 140 disposed in the unsafe environment. In one embodiment, the signal power source is, for example, an audio power amplifier that is capable of generating a maximum 28 $V_{rms}$ signal or ±45 volts DC under a faulted condition.

The safe area voltage regulator 120 is designed to limit the voltage signal produced by the signal power source 110 to a maximum voltage threshold regardless of the failure modes provided in the signal power source 110. The safe area voltage regulator 120 is also designed to ensure that the voltage signal outputted from the safe area voltage regulator component 120 to the safe area voltage and current interface component 130 is maintained near the maximum voltage threshold but does not exceed the maximum voltage threshold, even if one or more faults occur in the safe area voltage regulator 120 or if a fault occurs at the signal power source 110.

In one embodiment, the safe area voltage regulator 120 limits the voltage signal from signal power source 110 from a maximum 28 $V_{rms}$ signal to an approximately 12 $V_{rms}$ signal. Particularly, the safe area voltage regulator 120 is designed to operate and fail in a safe manner. That is, the safe area voltage regulator 120 is provided with multiple redundancies to ensure that any voltage signal sent out of the safe area voltage regulator 120 is maintained near the maximum voltage threshold but does not exceed the maximum voltage threshold. For example, even if a 250 $V_{rms}$ signal (occurring when a fault that allowed a primary power signal (e.g. 60 Hz in the US) to pass through the signal power source 110 and into the voltage regulator 120), the voltage regulator 120 will still output a 12 $V_{rms}$ signal for a limited time, and then safely fail (i.e. safely prevent a voltage signal from being outputted from the safe area voltage regulator 120).

The safe area voltage and current interface component 130 is provided to ensure that the signal outputted from the system 100 is limited to intrinsically safe voltage and current levels, but still sufficient to drive the external electronic component 140. For example, in a mine environment, the voltage and current outputted from the system 100 (and thereby the explosion proof box 105) needs to be low enough to prevent an explosive spark from occurring if, for example, the connection to the external electronic 140 breaks or another type of fault at the external electronic component 140 occurs. At the same time, the safe area voltage and current interface component 130 is designed to provide sufficient current to adequately drive the electronic component 140.

In some embodiments, the external electronic component 140 is a magnetic antenna for transmitting an audio signal and the safe area voltage and current interface component 130 includes additional antenna tuning circuitry for transmitting magnetic communications via the external electronic component 140. Also, in some embodiments, the safe area voltage and current interface 130 is configured to output a signal with a current approximately between 1-2 amps. Examples of a safe area voltage and current interface component that can be used in conjunction with the embodiments provided herein are disclosed in U.S. application Ser. No. 12/979,701, filed on Dec. 28, 2010 and titled SAFE AREA VOLTAGE AND CURRENT INTERFACE.

In other embodiments, the external electronic component 140 can be, for example, a relay actuator, a solenoid actuator, an AC motor, and a DC motor.

Figure 2:
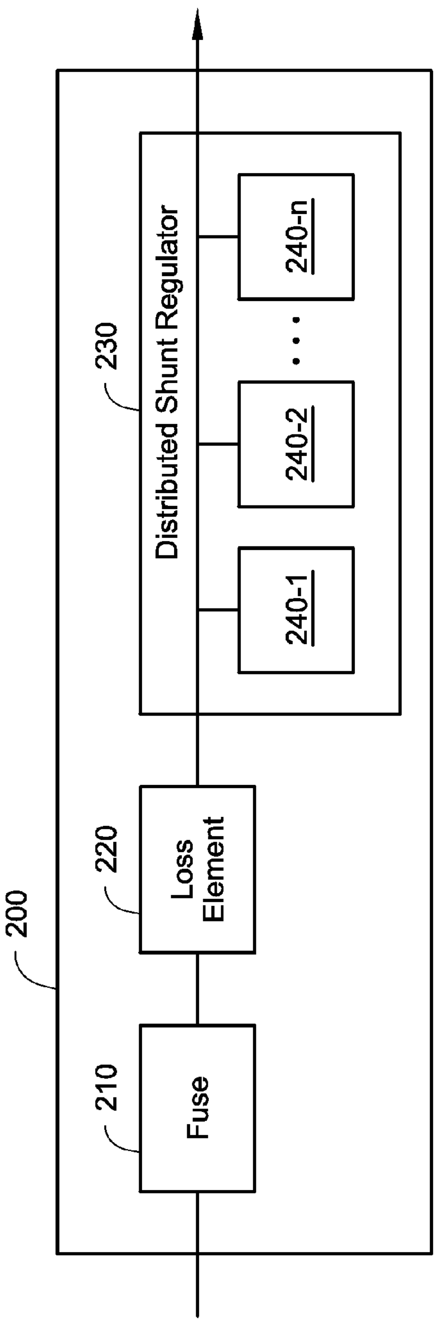
FIG. 2 is a block diagram of a safe area voltage regulator component, according to one embodiment.

FIG. 2 is a block diagram of one embodiment of a safe area voltage regulator component 200. The safe area voltage regulator component 200 includes a fuse 210, a loss element 220, and a distributed shunt regulator 230. Particularly, the safe area voltage regulator component 200 is designed to regulate the peak voltage of a voltage signal generated by a signal power source so that the peak voltage of the voltage signal outputted from the safe area voltage regulator 200 is maintained near a safe area voltage threshold but does not exceed the safe area voltage threshold. This is even if one or more faults occur in the safe area voltage regulator component 200 or a fault occurs in the signal power source (such as the signal power source 100 shown in FIG. 1) that inputs a voltage signal to the safe area voltage regulator component 200.

In operation, a voltage signal entering the safe area voltage regulator component 120 first passes through the fuse 210. The fuse 210 provides an additional layer of protection in the voltage regulator component 200 by opening before the distributed shunt regulator 230 fails for a far out of bounds voltage (such as a 250 $V_{rms}$ signal). However, even before the fuse 210 opens, the voltage regulator component 200 will still output a voltage signal that does not exceed the safe area voltage threshold. In one embodiment, the fuse 210 is a very fast-acting fuse such as PICO II 263 Series Fuse from Littlefuse, Inc. In other embodiments, the fuse 210 can be replaced by other fast interrupt devices, such as a circuit breaker.

The fuse 210 is directly connected to the loss element 220. The loss element 220 is designed to work against the distributed shunt regulator 220 by limiting the maximum current available to the distributed shunt regulator 220.

Preferably, the loss element 220 is made up of a plurality of resistor elements connected in series (not shown). A plurality of resistor elements connected in series is used as opposed to a large single resistor element in order to provide redundancy and fault protection in case one or more of the resistor elements is shorted out. This allows the safe area voltage regulator component 200 to still operate safely by maintaining the peak voltage of the voltage signal outputted from the safe area voltage regulator component 200 near but not exceeding the safe area voltage threshold even if one or more of the resistor elements in the loss element 220 fails. In other embodiments, the loss element 220 can be one or more inductor elements, capacitor elements, or any other types of impedance elements connected in series.

The loss element 220 is directly connected to the distributed shunt regulator 230.

The distributed shunt regulator 230 is made up of a plurality of independent shunt regulators 240-1 to **240-*n* that are connected in parallel. In one embodiment, the shunt regulators 240-1 to 240-*n*** are bipolar shunt regulators.

Each of the shunt regulators 240-1 to **240-*n* is designed to limit an equal amount of the peak voltage of the inputted voltage signal to achieve a safe area voltage level. For example, if 25 shunt regulators are used, each of the bipolar shunt regulators 240-1 to 240-*n* is configured to limit the inputted voltage signal to approximately the same peak voltage value. For input voltages that exceed the safe area voltage value, the shunt regulators 240-1 to 240-*n* draw more current which increases the voltage drop across the loss element 220, thereby maintaining the desired voltage outputted from the voltage regulator component 200. In an ideal system, the current drawn by each shunt regulator 240-1 to 240-*n*** is based on the equation:

$$(0.25*(V_{in}-V_{safe}))/Z_{loss\text{-}element}$$

where $V_{in}$ is the voltage level inputted into the voltage regulator component 200, $V_{safe}$ is the safe area voltage level, and $Z_{loss\text{-}element}$ is the impedance of the loss element 220.

The plurality of shunt regulators 240-1 to **240-*n* connected in parallel is used as opposed to a large single shunt regulator in order to provide redundancy and fault protection in case a fault occurs in one or more of the shunt regulators 240-1 to 240-*n***.

This allows the safe area voltage regulator component 200 to still operate safely by maintaining the peak voltage of the voltage signal outputted from the safe area voltage regulator component 200 near but not exceeding the safe area voltage threshold, even if one or more of the shunt regulators 240-1 to **240-*n* in the distributed shunt regulator 230** fails.

For example, in an embodiment where the distributed shunt regulator 230 includes 25 independent shunt regulators 240-1 to 240-25, if two of the 25 shunt regulators (e.g., shunt regulators 240-1 and 240-2) were to fail, the remaining 23 shunt regulators (e.g., shunt regulators 240-3 to 240-25) each limit the peak voltage of the inputted voltage signal to reach the same set safe area voltage level.

Thus, as the number of shunt regulators 240-1 to **240-*n* connected in parallel increases, the amount of change in the voltage level outputted by the safe area voltage regulator component decreases when one or more of the shunt regulators 240-1 to 240-*n* fail. The minimum number of shunt regulators that can be used and still ensure that the safe area voltage level is not exceeded is two, with no maximum upper limit. However, preferably, the number of shunt regulators 240-1 to 240-*n*** is at least three or more.

FIG. 3 provides a circuit schematic of one embodiment of a safe area voltage regulator component 300 that is designed to meet current MSHA safety requirements. Particularly, the safe area voltage regulator component 300 is designed to regulate the full output of a 250 $W_{rms}$ power signal so that the peak voltage of the voltage signal outputted from the safe area voltage regulator component 300 is maintained near but does not exceed a safe area voltage threshold of approximately 12 V.

A voltage signal is inputted into the safe area voltage regulator component 300 via an input terminal 305. The input terminal 305 is directly connected to the fuse 310. The fuse 310 is a very fast-acting fuse designed based on MSHA safety requirements.

The fuse 310 is directly connected to a loss element 320. As shown in FIG. 3, the loss element 320 is made up of nine resistors 325 connected in series. The loss element 320 is directly connected to the distributed shunt regulator 330.

The distributed shunt regulator 330 is made up of 25 bipolar shunt regulators 340. In other embodiments, the distributed shunt regulator 330 can made up of three or more bipolar shunt regulators 340 to satisfy current MHSA safety requirements. Each of the bipolar shunt regulators 340 is connected in series to a corresponding shunt regulator stability element 345 and then to a ground 350. The shunt regulator stability elements 345 provide stability for minor variances between each of the corresponding shunt regulators 340. That is, in a non-ideal situation the shunt regulators will not share current as the non-ideal shunt regulator with the lowest actual regulate voltage will pull all of the current until the shunt regulator fails, leading to the non-ideal shunt regulator with next lowest actual regulate voltage pulling all of the current. The end result is that a cascade of failures will result, allowing the full voltage inputted into the voltage regulator component 200 to appear at the output of the voltage regulator component 200. Thus, the resistance value of each regulator stability element 345 is selected based on the variances (e.g. the regulate voltage) of the corresponding bipolar shunt regulator 340.

The distributed shunt regulator 330 is directly connected to the output terminal 355, whereby the voltage signal with the regulated peak voltage is outputted from the safe area voltage regulator component 300.

The safe area no-load voltage outputted from the safe area voltage regulator component 300 and the current passing through a single shunt regulator $340_n$ is determined using the equations:

$$V_{safe}=V_{in}-Z_{320}*(I340_1+I340_2+\ldots+I340_n),$$

$$I340_n=(V\text{in}-V340_n)/(Z320+N*Z345_n)$$

where $V_{safe}$ is the desired safe area voltage outputted from the safe area voltage regulator component 300 via output terminal 355, $V_{in}$ is the peak input voltage inputted into the safe area voltage regulator component 300 via the input terminal 305, $V340_n$ is the regulate voltage of one of the bipolar shunt regulator 340, $I340_n$ is the current passing through one of the bipolar shunt regulators 340, $Z345_n$ is the impedance of one of the shunt regulator stability elements 345, Z320 is the impedance of the loss element 320, and N is the number of bipolar shunt regulators 340 in the voltage regulator component 300.

To ensure that the current in one of the bipolar shunt regulators 340 ($I340_n$) is never zero amperes and never exceeds the maximum current allowed for the shunt regulator 340 to operate without failure, numerous variables are considered, including: the regulate voltage variations between each of the bipolar shunt regulators 340, the number of allowable failures in the safe area voltage regulator component 300, temperature variations, the desired safe area voltage ($V_{safe}$), etc.

FIG. 4 provides an example of one embodiment of a bipolar shunt regulator 400 that can be used as the bipolar shunt regulator 340 for use in the safe area voltage regulator component 300. The bipolar shunt regulator 400 is made up of two zener diodes 405 arranged in opposing directions. In other embodiments, the bipolar shunt regulators 340 have a different design than the bipolar shunt regulator 400.

FIGS. 5-7 provide waveform transients of a voltage signal outputted from the output terminal 355 based on different voltage signals inputted into the safe area voltage regulator component 300 from a signal power source. Particularly, FIG. 5 shows the output voltage signal from the safe area voltage regulator component 300 when a signal power source inputs a 23 V peak AC signal to the input terminal 305. FIG. 6 shows the output voltage signal from the safe area voltage regulator component 300 during a signal power source failure where the signal power source inputs a 35 V peak AC signal to the input terminal 305, FIG. 7 shows the output voltage signal from the safe area voltage regulator component 300 during a signal power source failure where the signal power source inputs a 45 V peak DC signal to the input terminal 305. In each of these scenarios, the voltage signal outputted by the safe area voltage regulator component 300 is maintained at an approximately 12 $V_{rms}$, but does not exceed the 12 $V_{rms}$ value. That is, regardless of faults to the signal power source providing a voltage signal to the safe area voltage regulator component 300, the safe area voltage regulator component 300 is able to output a voltage signal that maintains but does not exceed the safe area voltage threshold level.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A safe area voltage regulator, comprising:
- a loss element component that includes a plurality of loss elements connected in series;
- a distributed shunt regulator directly connected to the loss element component, the distributed shunt regulator including a plurality of shunt regulators connected in parallel, the distributed shunt regulator is configured to regulate a peak voltage of a voltage signal to below a maximum voltage threshold; and
- an output terminal directly connected to the distributed shunt regulator and configured to output the voltage signal with the regulated peak voltage,
- wherein the safe area voltage regulator is configured to ensure that the regulated peak voltage of the voltage signal does not exceed the maximum voltage threshold when a fault occurs to one of the plurality of shunt regulators.

2. The safe area voltage regulator of claim 1, wherein the plurality of loss elements are resistor elements.

3. The safe area voltage regulator of claim 1, wherein the distributed shunt regulator includes at least three shunt regulators connected in parallel.

4. The safe area voltage regulator of claim 1, wherein the plurality of shunt regulators are bipolar shunt regulators.

5. The safe area voltage regulator of claim 1, wherein the safe area voltage regulator is configured to ensure that the regulated peak voltage of the voltage signal does not exceed the maximum voltage threshold when a fault occurs in a signal power source that inputs the inputted voltage signal into the safe area voltage regulator.

6. A safe area electronic system, comprising:
- a signal power source that generates a voltage signal;
- a safe area voltage regulator that receives the voltage signal and outputs the voltage signal with a regulated peak voltage that does not exceed a safe area voltage threshold, the safe area voltage regulator including:
  - a loss element component that includes a plurality of loss elements connected in series,
  - a distributed shunt regulator directly connected to the loss element component, the distributed shunt regulator including a plurality of shunt regulators connected in parallel, and
  - an output terminal directly connected to the distributed shunt regulator and configured to output the voltage signal with the regulated peak voltage,
  - wherein the safe area voltage regulator is configured to ensure that the voltage signal with the regulated peak voltage does not exceed a maximum voltage threshold when a fault occurs to one of the plurality of shunt regulators; and
- a safe area voltage and current interface that receives the voltage signal with the regulated peak voltage and outputs an intrinsically safe signal that is configured to drive an electronic component located in an unsafe environment.

7. The safe area electronic system of claim 6, wherein the signal power source, the safe area voltage regulator and the safe area voltage and current interface are disposed in an explosion proof box.

8. The safe area electronic system of claim 6, wherein the signal power source is an audio power amplifier.

9. The safe area electronic system of claim 6, wherein the safe area voltage and current interface includes an antenna tuning circuit that is configured to drive a magnetic antenna.

10. The safe area electronic system of claim 6, wherein the plurality of loss elements are resistor elements.

11. The safe area electronic system of claim 6, wherein the distributed shunt regulator includes at least three shunt regulators connected in parallel.

12. The safe area electronic system of claim 6, wherein the plurality of shunt regulators are bipolar shunt regulators.

13. The safe area electronic system of claim 6, wherein the safe area voltage regulator is configured to ensure that the voltage signal with the regulated peak voltage does not exceed the maximum voltage threshold when a fault occurs in the signal power source.

* * * * *